ପ୍ରୟୋଗ

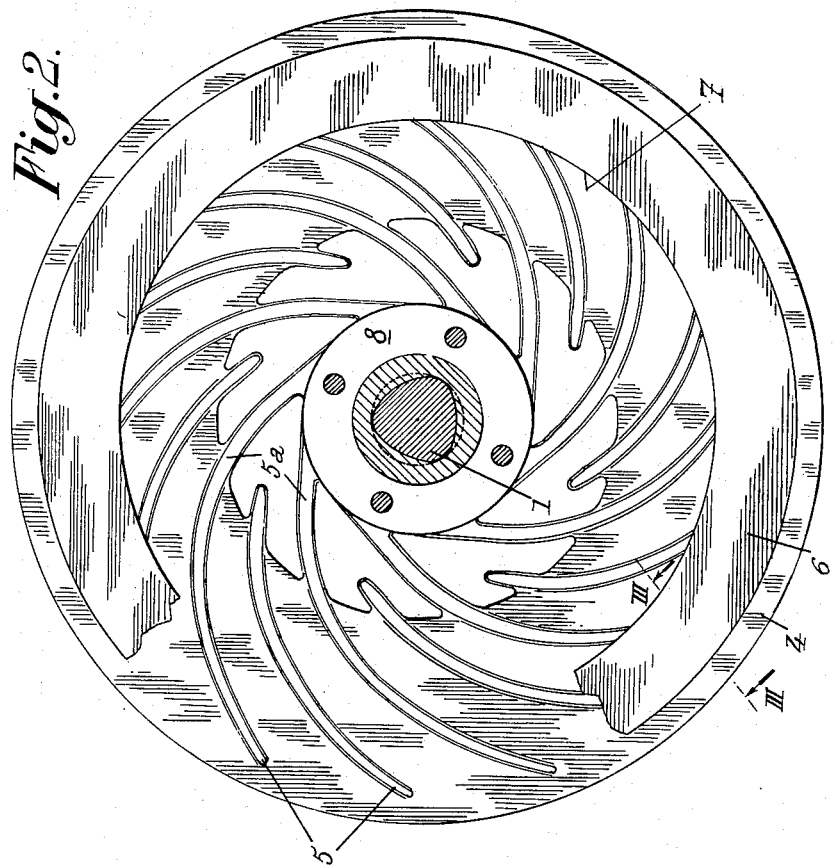
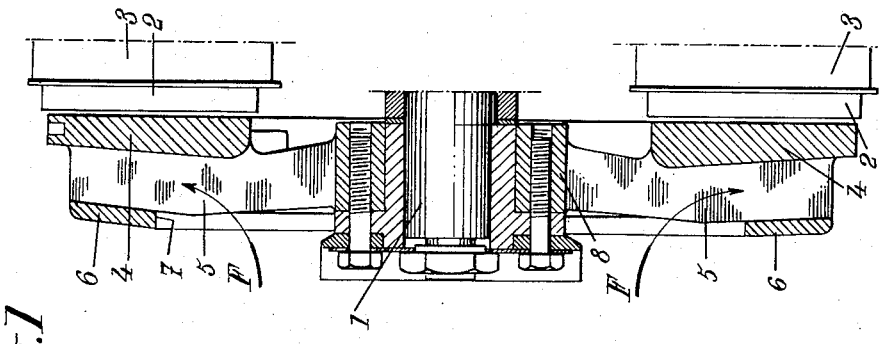
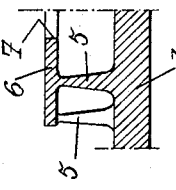

United States Patent Office 3,026,431
Patented Mar. 20, 1962

3,026,431
EDDY CURRENTS BRAKING APPARATUS
Pierre Etienne Bessière, Neuilly-sur-Seine, France, assignor to Compagnie Telma, Paris, France, a society of France
Filed July 17, 1958, Ser. No. 749,161
Claims priority, application France July 30, 1957
3 Claims. (Cl. 310—93)

This invention relates to braking apparatus and the like comprising a rotor or armature formed of a disc adapted to rotate in front of the lateral magnetic poles of an inductor, the said poles being disposed substantially in a transverse plane with respect to the shaft which carries the disc. Under the action of the magnetic field of the inductor poles rotation of the armature disc or rotor develops eddy currents and the latter in turn impart a reactive or braking torque to the disc or rotor, the power absorbed being transformed into heat in the disc. The side of the disc which is opposed to the inductor poles is quite free and may therefore be effectively cooled to dissipate the heat thus generated.

A first object of this invention is to provide an apparatus of the kind in question which will be more powerful, i.e. which, under determined conditions, will develop a higher braking torque than the hitherto known constructions, or which, for the same braking torque, will be lighter in weight.

Another object of this invention is to improve the cooling action of air on the armature disc or rotor and to reduce the undesirable fly-wheel effect of the latter in operation.

A further object of this invention is to provide an eddy currents apparatus or the like of the aforesaid character wherein the outer or free side of the armature disc or rotor is provided with ribs extending from the periphery of the said disc towards the central portion thereof to form cooling fins, the edges of some at least of these ribs being connected with each other by a connecting member which forms an integral portion of the disc, the latter being preferably made of ferro-magnetic material together with the ribs or fins and the connecting member, and the said connecting member being situated, at least in part, in front of the magnetic poles of the inductor.

Still a further object of this invention is to provide an eddy currents braking apparatus of the character above-mentioned, wherein the outer or free side of the armature disc or rotor is formed with inwardly directed ribs the edges of some at least of the said ribs being covered by an annular covering plate which terminates short of the central portion or hub of the disc to form with the ribs thereof cooling air passages whereby air from the central zone of the rotor or disc will flow towards the periphery thereof, the said covering plate being conveniently formed by the aforesaid connecting member which forms an integral part of the disc or rotor.

Still a further object of this invention is to form the rotor or armature disc of an eddy currents braking apparatus of the kind in question with a thickness which decreases from the central portion of the said disc or rotor to the periphery thereof.

Still a further object of this invention is to provide an armature or rotor for an eddy currents braking apparatus in the form of a disc comprising an annular portion and a central portion or hub, the said portions being connected with each other by ribs formed on one side of the rotor and extending inwardly from the periphery of the annular portion to the central portion or hub, the said ribs being preferably curved with the convexity of the curve facing the direction of rotation of the disc or rotor to conform with the natural path of the air stream under the action of centrifugal force and also to provide for expansion of the annular portion of the disc or rotor under the action of heat generated by the eddy currents.

In the annexed drawings:
FIG. 1 is a fragmental axial section of an eddy currents braking apparatus according to this invention, the inductor being only partly illustrated.
FIG. 2 is an end view thereof with parts in section.
FIG. 3 is a detailed section taken along line III—III of FIG. 1.

In FIG. 1 reference numeral 1 designates the shaft to be braked, while 2 designates the lateral poles of the stationary inductor member or stator which surrounds the end of shaft 1. Reference numeral 3 refers to the statoric windings adapted to generate the magnetic field which passes through the movable armature member or rotor. The latter is illustrated as in the form of a single disc, although it may be convenient to provide two such discs, one of each side of a symmetrical inductor. The disc or discs rotate in front of poles 2, the latter being disposed in a transverse plane with respect to shaft 1.

With such an arrangement one of the lateral faces or sides of the armature disc or rotor, namely the left hand side in FIG. 1, is quite free at the end of the apparatus and is thus easily cooled by ventilation and/or radiation. For this purpose the free side of disc 4 is provided with cooling fins 5 formed by ribs projecting from the said disc and extending from the periphery thereof to its central portion or hub.

In accordance with a first feature of the present invention the marginal outer edges of some at least of ribs 5 are connected with each other by means of a connecting member 6 which is preferably integral with the disc 4 and its ribs, the whole unit being made of a ferro-magnetic material and intersecting at least a portion of the space situated around shaft 1 in front of the inductor poles 2, in such a manner as to move in at least a portion of the magnetic field generated by windings 3.

Member 6 is preferably in the form of a plate substantially parallel to the adjacent side of disc 4 and its thickness is conveniently at least equal to the thickness of ribs 5 themselves, as indicated in FIG. 3.

Experience has shown that by thus connecting together the outer edges of ribs 5 in the zone of disc 4 wherein the latter is submitted to eddy currents, the braking torque of a given apparatus is substantially increased without any additional modification of this apparatus.

In accordance with another feature of this invention the free edges of some at least of ribs 5 in the marginal zone of disc 4 are covered by means of an annular covering member the inner edge 7 of which is spaced from shaft 1 or from the central portion or hub 8 of disc 4, in order to leave free access for the cooling air which flows into the passages provided between the said covering member and disc 4 under the action of centrifugal force.

Although the aforesaid covering member may be formed of a separate sheet iron part appropriately secured on fins or ribs 5 by any convenient means, as by screws, it is of particular advantage to form the said covering member by means of plate 6 itself which, as above-indicated, is integral with ribs 5 and disc 4. For this purpose plate 6 is of annular form, as shown, to permit air to flow as indicated by arrows F.

According to a further feature of this invention disc 4 is of radially decreasing thickness from its innermost portion to its outermost edge. Owing to this arrangement the moment of inertia of the armature disc or rotor about shaft 1 is reduced for a given total weight. This reduces the undesirable flywheel action of the disc or rotor of the apparatus.

Still in accordance with a further feature of the present invention disc 4 comprises a central portion or hub 8 and a relatively flat ring or annular portion, some at least of the ribs 5 formed in the outer or free side of said flat ring extending inwardly as at 5a to connect the said ring or annular portion with central portion or hub 8; and ribs or fins 5, and preferably also extensions 5a, are curved with respect to the radii with the convexity of the curve facing the direction of rotation of the disc. By properly selecting the shape of the curve, ribs 5, 5a will substantially follow the natural path of the air stream which flows from the central portion of the armature disc or rotor towards the periphery thereof, whereby power-losses will be minimized during the non-braking periods. Also the curved contour of extensions 5a provides for expansion of the annular portion or ring under the action of heat generated by eddy currents.

I claim:

1. An eddy currents braking or like apparatus comprising a rotatable shaft, a stationary inductor embodying lateral magnetic poles disposed substantially in a plane transverse to said shaft, an armature disc carried by said shaft to rotate in front of said magnetic poles, said armature disc being formed with ribs integral therewith and extending from the periphery towards the central portion of said disc on the outer free side thereof opposed to said poles, and an annular plate covering a portion of said ribs in the peripheral zone of said disc, the inner edge of said plate being spaced from the central portion of said disc, the thickness of said disc decreasing from its central portion to the periphery thereof, said armature disc, ribs and plate being made of ferromagnetic material.

2. An eddy currents braking or like apparatus comprising a rotatable shaft, a stationary inductor embodying lateral magnetic poles disposed substantially in a plane transverse to said shaft, an armature disc having an annular portion and a hub portion whereby it is carried by said shaft to rotate in front of said poles, said disc annular portion being formed with ribs integral therewith and extending from the outer periphery of said disc annular portion to the inner edge thereof on the outer free side thereof opposed to said poles, some at least of said ribs extending beyond the inner edge of said disc annular portion and joining said disc hub portion to connect said disc annular portion with said disc hub portion, and an annular plate integral with said ribs and partly covering them opposite said disc annular portion, the outer diameter of said annular plate being substantially the same as the outer diameter of said disc annular portion, and the inner diameter of said annular plate being substantially greater than the inner diameter of said disc annular portion, the thickness of said annular plate being substantially equal to that of said ribs, said armature disc, ribs and plate being made of ferromagnetic material.

3. An eddy currents braking or like apparatus as claimed in claim 2 wherein said ribs are curved with respect to the radii of said armature disc with the convexity of the curve facing the direction of rotation of said armature disc.

References Cited in the file of this patent

UNITED STATES PATENTS

| | | |
|---|---|---|
| 2,068,820 | Sarazin | Jan. 26, 1937 |
| 2,110,663 | Gouldthorpe | Mar. 8, 1938 |
| 2,503,704 | Bessiere | Apr. 11, 1950 |
| 2,796,541 | Bessiere | June 18, 1957 |

FOREIGN PATENTS

| | | |
|---|---|---|
| 1,119,161 | France | Apr. 3, 1956 |